United States Patent
Cardinali

(10) Patent No.: US 10,240,076 B2
(45) Date of Patent: Mar. 26, 2019

(54) SELF-ADHESIVE BITUMINOUS SHEATH FOR BUILDING AND BITUMEN MODIFIER FOR SELF-ADHESIVE BITUMINOUS SHEATH

(71) Applicant: TECNOFILM S.P.A., Sant'Elpidio a Mare (FM) (IT)

(72) Inventor: Bruno Cardinali, Fermo (IT)

(73) Assignee: TECNOFILM S.P.A., Saint'Elpidio a Mare (FM) (IT)

( * ) Notice: Subject to any disclaimer, the term of this patent is extended or adjusted under 35 U.S.C. 154(b) by 0 days.

(21) Appl. No.: 15/325,151

(22) PCT Filed: Jul. 17, 2015

(86) PCT No.: PCT/EP2015/066499
§ 371 (c)(1),
(2) Date: Jan. 10, 2017

(87) PCT Pub. No.: WO2016/012383
PCT Pub. Date: Jan. 28, 2016

(65) Prior Publication Data
US 2017/0183552 A1 Jun. 29, 2017

(30) Foreign Application Priority Data
Jul. 23, 2014 (IT) .............................. MC2014A0058

(51) Int. Cl.
| | | |
|---|---|---|
| *C09J 195/00* | (2006.01) | |
| *C09J 11/08* | (2006.01) | |
| *C08L 95/00* | (2006.01) | |
| *C08K 5/01* | (2006.01) | |
| *E04D 5/10* | (2006.01) | |

(52) U.S. Cl.
CPC .............. *C09J 195/00* (2013.01); *C08K 5/01* (2013.01); *C08L 95/00* (2013.01); *C09J 11/08* (2013.01); *E04D 5/10* (2013.01); *C08L 2205/035* (2013.01); *C08L 2555/82* (2013.01); *C08L 2555/84* (2013.01); *C08L 2555/86* (2013.01)

(58) Field of Classification Search
CPC combination set(s) only.
See application file for complete search history.

(56) References Cited

U.S. PATENT DOCUMENTS

| | | | |
|---|---|---|---|
| 4,738,884 A * | 4/1988 | Algrim | E04D 1/26 428/198 |
| 5,362,566 A | 11/1994 | George et al. | |
| 5,807,911 A * | 9/1998 | Drieskens | C08L 53/02 524/68 |
| 6,172,145 B1 * | 1/2001 | Drieskens | C08L 95/00 524/68 |
| 2004/0172899 A1 * | 9/2004 | Paradise | C08L 95/00 52/302.1 |
| 2011/0076905 A1 * | 3/2011 | Mussig | C08L 23/142 442/151 |
| 2014/0013693 A1 * | 1/2014 | Zhou | B32B 5/16 52/408 |
| 2016/0075877 A1 * | 3/2016 | Kaiser | F16J 15/02 277/316 |
| 2017/0215622 A1 * | 8/2017 | Maravic | A47J 27/002 |

FOREIGN PATENT DOCUMENTS

| | | | |
|---|---|---|---|
| WO | 2009045057 A1 | 4/2009 | |
| WO | WO-2013064408 A1 * | 5/2013 | ............. C08L 95/00 |

OTHER PUBLICATIONS

Coaker, A.W.M. Calendering, Encyclopedia of Polymer Science and Technology, 2011, pp. 1-15 (Year: 2011).*
International Search Report for corresponding International Application No. PCT/EP2015/066499, Sep. 28, 2015.
Eastman Chemicals: "Regalite R1100 Hydrocarbon Resin", Apr. 2008, available at: http://eastman.com/supplemental/unrestricted/44/RegaliteR1100HydrocarbonResin.pdf.

* cited by examiner

*Primary Examiner* — Nicole M. Buie-Hatcher
(74) *Attorney, Agent, or Firm* — Egbert, McDaniel & Swartz, PLLC

(57) ABSTRACT

An adhesive bituminous sheath for building includes bitumen and an adhesivizing additive mixed with the bitumen, wherein the adhesivizing additive is an aliphatic and cycloaliphatic resin.

5 Claims, No Drawings

SELF-ADHESIVE BITUMINOUS SHEATH FOR BUILDING AND BITUMEN MODIFIER FOR SELF-ADHESIVE BITUMINOUS SHEATH

The present patent application for industrial invention relates to a self-adhesive bituminous sheath for building, and to a bitumen modifier for self-adhesive bituminous sheath.

Bituminous sheaths are known to protect roofings, terraces and other building structures, which play an important role in storing goods that need to be protected against the aggression of weather agents, such as light, water, snow and other natural phenomena.

The bitumen used for the production of sheaths must be modified in order to provide the properties that are necessary to meet the technical specifications because the bituminous product itself does not have such properties.

The patent application WO2013/064408 from the same applicant discloses the processes and precepts that are necessary to produce a bitumen modifier and modified bitumen suitable for being used to produce sheaths for building structures.

The manufacturing process of a bituminous sheath is largely described in scientific and patent literature, and its description is therefore omitted.

The application of traditional sheaths to different types of supports can be made in two different modes according to the type of materials, whether organic or inorganic materials.

Generally speaking, in case of inorganic supports, such as cement, ceramic tiles, plaster and the like, the sheath is applied on the support after pre-treating the surface with bitumen in a fluid, melted or emulsified state. First, the fluid bitumen is applied on the support and then the sheath is applied on the bitumen that covers the support by partially melting the sheath surface.

Thermal activation with an open flame is avoided in case of organic supports, such as cellulose and protein by-products, and an adhesive sheath is applied on the support by means of simple contact and successive pressure. Adhesive sheaths are used for this type of applications, in which one side of the sheath, i.e. the one intended to come in contact with the support to be coated, is provided with a surface adhesive layer that guarantees a strong sheath-support bond after application.

Adhesive sheaths are especially useful to protect non-mineral supports because it is very simple to use and its application does not require any special equipment.

The manufacturing process of adhesive sheaths requires additional processing steps, such as the application of the adhesive material and its protection with an anti-adhering plastic film in order to allow for optimal handling, with higher costs compared to a traditional product. Moreover, it is necessary to use an additional installation with machines used to melt and dose the resins that are used for the adhesive layer.

Numerous attempts have been made to overcome such a problem by inserting adhesivizing additives directly in the bituminous mix in order to provide it with the necessary adherence properties. However, in order to achieve acceptable adhesion, high concentrations of adhesivizing additives must be used, which are generally derived from colophonies in natural, hydrogenated, esterified or modified state, phenolic resins, glycerol-ester resins, terpenic resins, petrolic resins and the like. When they are inserted in the mass of the sheath and are not positioned on the surface, all commercial products suitable for giving certain adhesion properties to bitumen require using a high concentration.

These adhesivizing additives are very soluble in the bituminous means and their concentration on the surface of the sheath is considerably reduced, thus negatively affecting their adhesion properties. Therefore, a high mass concentration of the adhesivizing additive is necessary to obtain a suitable surface adhering effect, the said concentration being generally comprised between 10% and 15% in weigh percentage compared to the total weight of the sheath mix. Such a high quantity of adhesivizing additive negatively affects the intrinsic properties of bitumen and makes bitumen modification critical.

Therefore, all the known adhesivizing additives that are used in a high concentration significantly affect both the cost and the performance of the bituminous sheath, reducing its market penetration.

U.S. Pat. No. 5,362,566 discloses inorganic granular materials or crushed stones that are externally coated with a uniform layer of a coatable composition. Such a coatable composition must avoid the production of dust during grinding or transportation of the inorganic granular materials, which can be superficially treated with ceramic products and/or pigments. The composition of inorganic granular materials previously coated with the anti-dust mix is applied on layers of bitumen or asphalt for protection and/or decoration purposes. U.S. Pat. No. 5,362,566 does not disclose any application related with the permanent adhesion of bitumen or asphalt to organic or inorganic substrata with consistent continuous surfaces.

U.S. Pat. No. 5,362,566 clearly describes that the tackifier percentage of 0.5%-1.0% is only referred to the coating layer, and not to the total of granular material. Consequently, the tackifier percentage compared to the granular material is much lower than 1%. Evidently, with such a low tackifier percentage, the product cannot be welded to an organic or inorganic surface. In fact, being a localized, not homogeneous surface system, the coating absorbs dust particles, given the tackifier concentration available for capturing them. Instead, no anti-dust effect would be obtained if such a concentration was diluted on the entire mass of the granular material.

It must be considered that in order to join a layer of bituminous sheath to a substratum, it is necessary to use a surface adhesivizing system of the bituminous sheath, which is generally obtained by applying a thin layer of adhesive product on the bituminous sheath, which then acts as binder between bitumen and substratum. Such a spreading operation must be carried out only after producing the bituminous sheet so that the adhesive is concentrated at the maximum level on the surface. U.S. Pat. No. 5,362,566 does not disclose such a preparation method of a self-adhesive bituminous sheath because U.S. Pat. No. 5,362,566 does not relate to a self-adhesive bituminous sheath.

Moreover, the tackifiers used in U.S. Pat. No. 5,362,566 have a glass transition temperature (Tg) higher than 120° C., preferably higher than 150° C. It is therefore impossible to use these tackifiers on organic materials, such as wooden panels.

Regalite R1100 is a well known tackifier in polymeric resins in order to hold the color. Nevertheless the use of Regalite R1100 in bitumen in order to make them adhere to organic and/or inorganic supports is not known. It must be noted that the term "tack" literally means to stick, not to glue. Generally a tackifier is considered as a temporary adhesive used for joining two materials in non-permanent way.

WO2009/045056 describes bitumen modifiers according to the prior art, but it does not describe any self-adhesive bituminous sheath.

The purpose of the present invention is to eliminate the drawbacks of the prior art by providing a self-adhesive bituminous sheath for building and a bitumen modifier for self-adhesive bituminous sheath that is efficient, efficacious, inexpensive and simple to make.

Such a purpose has been achieved in accordance to the invention, with the characteristics claimed in the independent claims.

Advantageous embodiments of the invention appear from the dependent claims.

The self-adhesive bituminous sheath for building according to the invention comprises bitumen and an adhesivizing additive mixed with bitumen. The adhesivizing additive is a petrolic resin of aliphatic and cycloaliphatic type.

Advantageously, the sheath comprises a weight percentage of aliphatic and cycloaliphatic resin from 1% to 4% of the total weight.

In order to produce the said adhesive sheath, the applicant has searched for an adhesivizing additive with a very high adhering power, suitable for giving a correct modification of the bitumen in low concentrations, while making it adhesive.

The applicant has surprisingly discovered that an aliphatic fraction with low molecular weight obtained from distilling pyrolysis gasoline, after polymerization, produces a resin with excellent adhesive properties. The polymers and oligomers formed in the resin are of exclusively aliphatic type and a successive hydrogenation step reduces or eliminates the unsaturated component of these polymers and oligomers, further reducing their solubility in bitumen.

As a matter of fact, it must be considered that the solubility parameter of bitumen is high on average and therefore it is not very compatible with oligomers of paraffin type, whose solubility parameters are proximal to the minimum scale values. It must be considered that if a product is soluble, it will mix in the mass uniformly, while if it is insoluble it will soon or later separate, migrating towards the surfaces of the sheath.

The aliphatic and cycloaliphatic resin obtained according to the invention is mainly composed of oligomers derived from C5 unsaturated hydrocarbons, such as pentenes, pentadienes, cyclopentenes and cyclopentadienes, as well as from C4 and C6 hydrocarbon fractions, and successively the non-reacted products are separated by distillation.

Hydrocarbon resins are produced from numerous different fractions of petrochemical distillates; in general they are obtained from polymerizing distillates, coming from crackers, which contain high fractions of unsaturated hydrocarbons with an average of 5 carbon atoms in the molecule. According to the type of cracking process, the C5 distillates can contain other types of olefins, with C4 chains in percentage from 1% to 5% and C6 chains in percentage from 3% to 10%.

Given the fact that the aliphatic and cycloaliphatic resin is composed of compounds formed of Carbon and Hydrogen only, in general the hydrogenation phase saturates the double bonds of Olefins, Cyclo-olefins and Aromatic Nuclei, modifying the unsaturated components in Paraffins and Cycloparaffins.

The polarity of Paraffins is the lowest obtainable, being Carbon-Hydrogen compounds only with simple bonds C—C and C—H (hereinafter define as Sigma bonds), and therefore there is no possibility of separation of electronic charges that create the so-called polarity of an organic molecule, i.e. an electric dipole.

Instead, Olefins, Cyclo-olefins and Aromatic Nuclei always have C (carbon) and H (hydrogen), but also double bonds formed of a Sigma bond and a pi-bond, which result in dislocations of electronic charge such to create small dipoles in the molecule, originating a polarity.

The higher the number of double bonds, and the more conjugated they are, the higher the polarity of the molecule will be, in fact the Aromatic Nucleus is the highest in terms of polarity amongst the aforementioned components.

The hydrogenation eliminates the pi-bonds and consequently reduces the polarity of an organic compound.

As a consequence, if the aliphatic and cycloaliphatic resin molecule has a very low polarity, it will have a very high solubility in apolar compounds, and a very low solubility in polar compounds.

The explanation is that an apolar product can be separated in its single components (molecules) giving it a low energy, because it only has attractive bonds of Van der Waals (VdW) type, which is a particular attractive energy caused by temporary electric dipoles. These attractive bonds are an electric dipole phenomenon that only depends on the size of the molecule and originates a specific cohesive energy that will be the lowest energy necessary for separating the molecules. In polar systems the permanent electrical dipole component must be added to the VdW attractive component. The level of this energy can be represented in numerical form by the solubility parameter.

For example, in the case of polymers and oligomers, a cohesive energy value of 7.5 $[cal/cm^3]^{(1/2)}$ indicates a very low energy necessary for separating the molecules; on the contrary, a value of 15.0 $[cal/cm^3]^{(1/2)}$ indicates a high cohesive energy due to the co-participation of polar groups, hydrogen, ionic bonds, etc.

In general, bitumen can have a solubility parameter comprised between 8.3 and 9.0; in fact an apolar solvent such as Heptane with parameter 7.4 does not dissolve bitumen completely. In fact, bitumen is partially soluble in Heptane.

If totally aliphatic, a petrolic resin can have a solubility parameter of 7.6; instead, an aromatic variation of it can have a solubility parameter of 8.3-8.6.

If the difference in the solubility parameters is higher than +/−0.3, the two products are not perfectly soluble. Therefore, in view of the above, the parametric difference between the petrolic aliphatic and cycloaliphatic resin and bitumen is 0.6-1.0, out of the mutual solubility range.

The petrolic aromatic resin has a solubility parameter of 8.3-8.6, on average 8.5, and bitumen has a solubility parameter of 8.65 on average. Therefore, the difference is 0.15, it being a value that results in excellent solubility. Therefore the petrolic aromatic resin is not suitable for being mixed with bitumen because their solubility parameters are proximal. Instead, the aliphatic resin is suitable for being mixed with bitumen, because the solubility parameters are sufficiently different.

The production process of the aliphatic and cycloaliphatic resin is very similar to the one used for producing petrolic resins, but in this specific case only oligomers of aliphatic and cycloaliphatic type are obtained, with low polarity and low solubility parameter, not perfectly compatible with bitumen.

Following is a description of the different steps of the manufacturing process of an aliphatic resin.

A) Distillation of pyrolysis gasoline to obtain a mixture containing an olefinic fraction with low boiling point, formed of molecules with size C4-05.

B) Polymerization of this mixture of C4-05 unsaturated monomers to obtain an aliphatic and cycloaliphatic resin;

C) Hydrogenation of the resin to eliminate the unsaturated components.

D) Distillation of the hydrogenated resin to eliminate the non-reacted products.

With such a process, a petrolic aliphatic and cycloaliphatic resin in solid form is obtained, which can be added to hot bitumen at approximately 170°-190° C. In these conditions the aliphatic and cycloaliphatic resin is perfectly soluble in the bitumen, but when the ambient temperature is restored, the two products will be no longer soluble and the concentration in the various parts of the mass will be modified over time. During the cooling of the mass, the aliphatic and cycloaliphatic resin component tends to separate, transferring from the inside of the bituminous mass towards the free surfaces of the sheath. The final result is a higher concentration of adhesive product on the free surfaces of the sheath that will become active for the adhesion, thus reducing the concentration of adhesive product inside the mass of the sheath, and consequently amplifying the adhesion effect without increasing the initial concentration.

Using a weight percentage of aliphatic and cycloaliphatic resin of approximately 2% with respect to the total weight of the mixture of the sheath, the adhesion result is comparable to the one obtained with a weight percentage of 10% of a traditional adhesive by contact, perfectly soluble in bitumen.

In fact, the different solubility parameter between the aliphatic resin and the bitumen produces the desired adhesive effect thanks to a massive concentration of the resin that migrates from the inside of the sheath towards its surface.

The final adhesion effect is very similar to the one obtained by applying an adhesive layer on the surface of the sheath, which is the most used system in the building sector. The advantage of such a solution is basically economic because it eliminates the application of an adhesive layer that requires additional installations and machinery for melting and dosing, in a liquid phase, of the resins used to make the said adhesive layer.

In order to solve the problem of the cost-performance ratio of the self-adhesive sheath modified according to the prior art, the applicant has tested an extruded compound that combines in the same product two elements that are essential for the solution of the problem:

giving self-adhesion properties to the sheath in order to guarantee the simple and safe application on a support; and simultaneously modifying the characteristics of the bitumen used as base in order to make it suitable for protective use.

Advantageously, the aliphatic and cycloaliphatic resin can be mixed to the components of the bitumen modifier disclosed in WO2013/064408 and the mixture that is obtained can be extruded.

In such a case, the mixture to be extruded comprises:
Vulcanized rubber powder with granulometry lower than 0.4 mm,
SBS
Lubricant
Aliphatic resin.

Advantageously the weight percentage of vulcanized rubber powder is the same as the weight percentage of SBS. The weight percentage of the lubricant is from 1% to 50%, preferably 20-30% with respect to the weight of the mixture. The weight percentage of aliphatic resin is approximately 10%-40% with respect to the total weight of the mixture.

The said components are inserted in a double-screw extruder suitably provided with mixing sectors and processed at a temperature comprised between 160° C. and 200° C. The extruder produces a compound that is cut in chips of any size. The said chips of extruded compound are used to modify bitumen. Bitumen is modified by adding a weight percentage of the extruded compound between 10% and 30% with respect to the total weight of modified bitumen.

Such an embodiment provides one compound that, when added to bitumen during its transformation step, allows for modifying the bitumen as well as obtaining the adhesive property that is necessary for the cold application of a sheath in a single operation.

Moreover, it must be considered that the aliphatic resin has storage problems because it needs to be stored in rooms with maximum ambient temperature of 20° C. Instead, the extruded compound of the invention, which contains aliphatic resin, can be stored also at temperatures up to 35° C.

The self-adhesive bituminous composition of the invention is suitable for being permanently welded to supports with organic and inorganic base, such as wood, cement or other material. Such a self-adhesive bituminous composition strongly adheres to the support to be protected and maintains such an adhesive capacity for many years. The adhesion between the bitumen and the support is a real welding that is maintained over time and is not a simple temporary adhesion that is considerably reduced when the bitumen has cooled down.

The aliphatic and cycloaliphatic resin used as adhesivizing agent has a softening point lower than 100° C., consequently its glass transition temperature (Tg) is much lower than 100° C.

Following are some comparative examples.

EXAMPLE 1 (INVENTION—ALIPHATIC RESIN)

| BITUMEN grade 160/220[1] | | 87.5 parts |
| --- | --- | --- |
| Modifier type CPR/3T[2] | | 12 parts |
| Aliphatic resin type C5[3] | | 2.5 parts |
| Analytical results | | |
| Ring ball | ° C. | 99 |
| Penetration | dmm | 46 |
| Peeling Test[4] | g/cm | 550 |

[1]The BITUMEN grade 160/220 is a standard (non modified) bitumen with penetration grade 160/220 at 25° C.
[2]The Modifier type CPR/3T is made according to the precepts of the patent application WO2013/064408
[3]The Aliphatic Resin type C5 is a product known on the market with the brand REGALITE R 1100-completely aliphatic and cycloaliphatic resin.
[4]The Peeling Test was tested with Adhesion on Steel.

EXAMPLE 2 (AROMATIC RESIN)

| BITUMEN grade 160/220 | | 87.5 parts |
| --- | --- | --- |
| Modifier type CPR/3T | | 12 parts |
| Aromatic Resin[5] | | 2.5 parts |
| Analytical results | | |
| Ring ball | ° C. | 97 |
| Penetration | dmm | 50 |
| Peeling Test | Kg/cm | 260 |

[5]The Aromatic Resin is a product known on the market with the brand REGALITE R 9100-aromatic resin.

EXAMPLE 3 (COLOPHONIC RESIN)

| | | |
|---|---|---|
| BITUMEN grade 160/220 | | 87.5 parts |
| Modifier type CPR/3T | | 12 parts |
| Colophonic Resin[6] | | 2.5 parts |
| Analytical results | | |
| Ring ball | ° C. | 97 |
| Penetration | dmm | 52 |
| Peeling Test | Kg/cm | 275 |

[6]The product used is modified colophonic resin.

EXAMPLE 4 (WITHOUT ADHESIVIZING AGENT)

| | | |
|---|---|---|
| BITUMEN grade 160/220 | | 87.5 parts |
| Modifier type CPR/3T | | 12 parts |
| Analytical results | | |
| Ring ball | ° C. | 97 |
| Penetration | dmm | 52 |
| Peeling Test | Kg/cm | 50 |

The aforementioned examples and the results obtained in the Peeling Test demonstrate that the aliphatic and cycloaliphatic resin gives higher adhesive properties both compared to the aromatic and the colophonic resin.

The high value obtained in the peeling test in example 1, compared to examples 2 and 3 with the same concentration of adhesive resin, is due to the different solubility of the aliphatic resin in the bitumen, which determines a surface accumulation with a consequent increase of its local concentration.

In fact, the other two resins (aromatic resin and colophonic resin) are perfectly soluble in the bitumen, therefore these resins do not originate migration phenomena towards the external surfaces, the adhesive concentration remains practically constant in all parts of the bituminous mixture and the results of the peeling test are consequent to such a characteristic.

The invention claimed is:

1. A permanent adhesive bituminous sheath for use in construction, the permanent adhesive bituminous sheath comprising:
   a bitumen; a bituminous modifier comprising vulcanized rubber powder with a granularity of less than 0.4 millimeters, styrene-butadiene-styrene polymer and a lubricant and
   an adhesivizing additive mixed with said bitumen, said adhesivizing additive being a mixture of only aliphatic and cycloaliphatic resin in an amount of between 1 and 4 weight percent of a total weight of the adhesive bituminous sheath.

2. The permanent adhesive bituminous sheath of claim 1, wherein said aliphatic and cycloaliphatic resin comprises oligomers derived from C5 unsaturated hydrocarbons and fractions of C4 and C6 hydrocarbons, wherein the oligomers derived from C5 unsaturated hydrocarbons are selected from the group consisting of pentenes, pentadienes, cyclopentenes, cyclopentadienes and mixtures thereof.

3. The permanent adhesive bituminous sheath of claim 1, wherein said bitumen modifier is between 10 and 30 weight percent of the total weight of the adhesive bituminous sheath.

4. A method of manufacturing a permanent adhesive bituminous sheath, the method comprising:
   forming a bituminous modifier by extruding a mixture of vulcanized rubber powder with a granularity less than 0.4 millimeters, styrene-butadiene-styrene polymer, a lubricant and an adhesivizing additive being only an aliphatic and cycloaliphatic resin, the aliphatic and cycloaliphatic resin being between 10% and 40% of a total weight of the bituminous modifier; and
   mixing bitumen with the bituminous modifier.

5. The method of claim 4, wherein:
   the bitumen is mixed with the aliphatic and cycloaliphatic resin at a temperature of between 170° C. and 190° C.

* * * * *